United States Patent
Blanding et al.

(10) Patent No.: US 8,782,655 B2
(45) Date of Patent: Jul. 15, 2014

(54) CONTROLLING COMPUTING RESOURCE CONSUMPTION

(75) Inventors: William H. Blanding, Nashua, NH (US); Franklin Greco, Pepperell, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1562 days.

(21) Appl. No.: 12/216,235

(22) Filed: Jul. 1, 2008

(65) Prior Publication Data

US 2010/0005473 A1 Jan. 7, 2010

(51) Int. Cl.
G06F 9/50 (2006.01)

(52) U.S. Cl.
CPC ............ *G06F 9/5005* (2013.01); *G06F 9/5083* (2013.01)
USPC ........................................... 718/104; 718/105

(58) Field of Classification Search
None
See application file for complete search history.

(56) References Cited

U.S. PATENT DOCUMENTS

| | | | |
|---|---|---|---|
| 5,930,773 A | 7/1999 | Crooks | |
| 6,094,650 A | 7/2000 | Stoffel | |
| 7,693,995 B2* | 4/2010 | Kudo et al. | 709/226 |
| 2002/0116441 A1* | 8/2002 | Ding et al. | 709/105 |
| 2003/0083994 A1 | 5/2003 | Ramachandran | |
| 2003/0083999 A1 | 5/2003 | Ramachandran | |
| 2003/0135339 A1 | 7/2003 | Gristina | |
| 2004/0236852 A1 | 11/2004 | Birkestrand | |
| 2005/0154860 A1 | 7/2005 | Arimilli | |
| 2005/0198641 A1 | 9/2005 | Eilam | |
| 2006/0026279 A1 | 2/2006 | Zigmond | |
| 2006/0106741 A1 | 5/2006 | Janarthanan | |
| 2006/0136928 A1 | 6/2006 | Crawford | |
| 2006/0224925 A1 | 10/2006 | Lake | |
| 2006/0253587 A1 | 11/2006 | Tullis | |

* cited by examiner

*Primary Examiner* — William B Partridge

(57) ABSTRACT

A method and a corresponding system, implemented as programming on a computer system, controls resource consumption in the computer system. The method includes the steps of monitoring current consumption of resources by workloads executing on the computer system; predicting future consumption of the resources by the workloads; adjusting assignment of resources to workloads based on the predicted future consumption, comprising: determining consumption policies for each workload, comparing the policies to the predicted future consumption, and increasing or decreasing resources for each workload based on the comparison; and providing a visual display of resource consumption and workload execution information, the visual display including iconic values indicating predicted consumption of instant capacity resources and authorization to consume instant capacity resources.

25 Claims, 4 Drawing Sheets

CONTROLLING COMPUTING RESOURCE CONSUMPTION

TECHNICAL FIELD

The technical field is management of computing resources.

BACKGROUND

Computer system users may have a need for varying amounts of computing resources. One way to accommodate fluctuating computing needs is through instant capacity (sometimes called instant capacity on demand (ICOD)). Instant capacity is a combined hardware and software system through which customers may acquire computing resources for which they pay a reduced price and have concomitant reduced usage rights. Temporary instant capacity (TiCAP) allows one or more hardware or software systems to be activated for a pre-paid period without requiring permanent usage rights. However, because of the complexity of certain instant capacity management schemes, customers may have trouble predicting and controlling TiCAP expenditures.

SUMMARY

What is disclosed is a method, implemented on a computing device, for controlling computing resource consumption in a computing system, the computing system comprising one or more resources, the computing system executing one or more workloads, each of the workloads assigned one or more of the resources, each of the workloads operating in accordance with one or more active policies, the method, comprising: monitoring execution of the workloads and consumption of the resources; displaying on a first visual display, for a current computing interval, a number of the resources currently consumed by each executing workload; predicting for a subsequent computing interval, numbers of resources that will be consumed for each executing workload; and providing the results of the prediction on a second visual display, wherein the first and the second visual displays comprise: workload identity, resource utilization, the active policies, and resource requests.

Also disclosed is a system, implemented as programming on a computer system, for controlling resource consumption in the computer system, comprising a monitoring module that monitors current consumption of resources by workloads executing on the computer system; a policy processing module that predicts future consumption of the resources by the workloads and provides a resource request to adjust assignment of resources to workloads based on the predicted future consumption, wherein the policy processing module determines consumption policies for each workload, and compares the policies to the predicted future consumption, and wherein the resource request call for increasing or decreasing resources for each workload based on the comparison; and a user interface module that generates a visual display of resource consumption and workload execution.

Further, what is disclosed is a method, implemented as programming on a computer system, for controlling resource consumption in the computer system, comprising the steps of monitoring current consumption of resources by workloads executing on the computer system; predicting future consumption of the resources by the workloads; adjusting assignment of resources to workloads based on the predicted future consumption, comprising: determining consumption policies for each workload, comparing the policies to the predicted future consumption, and increasing or decreasing resources for each workload based on the comparison; and providing a visual display of resource consumption and workload execution information, the visual display including iconic values indicating predicted consumption of instant capacity resources and authorization to consume instant capacity resources.

DESCRIPTION OF THE DRAWINGS

The detailed description will refer to the following drawings in which like reference numerals refer to like items, and in which.

DETAILED DESCRIPTION

Figure 1:
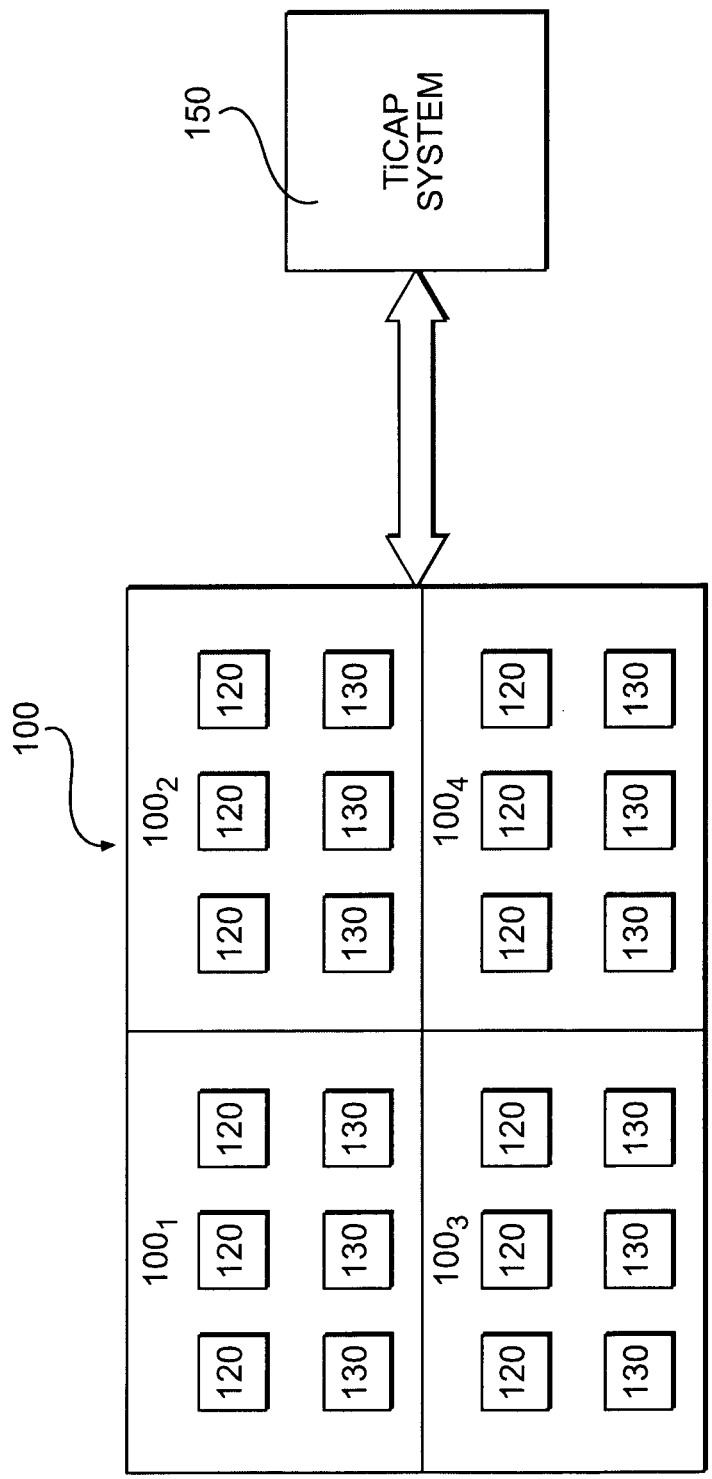
FIG. 1 is a block diagram of an exemplary computer system on which a workload management system for controlling resource consumption is implemented.

The herein disclosed system and method for controlling computing system resources is based on an overall computing system architecture that includes multiple processors and other resources. The processor and resources may be divided into two or more partitions. Each partition may have one or more processors assigned. Each partition runs an instance of an operating system. Resources in one partition may be shared with another partition. FIG. 1 is a block diagram of an exemplary version of such a computer system. In FIG. 1, computer system 100 includes partitions $110_i$. Each partition $110_i$ includes fully-licensed processors 120 for which the computer system user has full usage rights. By dividing the computer system 100 into partitions, and by allowing sharing of resources (i.e., the processors 120) across partition boundaries, the computer system 100 may be implemented with a smaller number of processors than if sharing were not allowed, or if workloads were assigned to separate computing systems. Thus, partitioning allows the computer system user to realize higher effective processor capacity with a reduced number of processors.

Each partition $110_i$ may additionally include one or more metered processors 130, for which the computer system user pays an incremental cost when using the metered resources. An example of a metered processor is an "instant capacity" processor. When using an instant capacity processor, the computer system user acquires usage rights on an "as needed" basis, and is charged accordingly. Thus, some of the instant capacity processors 130 in each partition $110_i$ may be temporarily assigned to operate when workload demands exceed the computing capacity of the processors 120. The computer system user pays for operation of the processors 120 regardless of their actual operating status. That is, the user pays for each processor 120 whether or not that processor is actually executing any operations. Indeed, the user pays for the processors 120 even if those processors 120 are not powered on. However, the user pays for the instant capacity processors 130 only when the instant capacity processors 130 are powered on and actually executing an operation. By paying for processing capacity "as needed" the computer system user can pay for a "small" computer system yet have a "large" computer system "in standby." Thus, the computer system 100 shown in FIG. 1 includes some processors (the processors 120) that are licensed and paid for by the user, and some processors (the instant capacity processors 130) that are unlicensed and are used only "on demand."

Of course, if the computer system 100 can satisfy its resource demands by reallocating unused processor capacity of the processors 120, then there is no need to access the instant capacity processors 130. The computer system 100 thus implements a borrowing scheme to temporarily transfer computing system resources (the processors 120) as needed to meet current demands, and only supplements this borrowing scheme with the instant capacity processors 130 when the available processor capacity from the processors 120 is not sufficient. The relationship between borrowing capacity from the processors 120 and using the instant capacity processors 130 will be described later in more detail.

To implement this borrowing scheme, the computer system user can assign each workload a minimum number of processors, an "owned" number of processors, and a maximum number of processors, and can specify these parameters as a policy to be implemented by the workload management system. As an example, workload 1 "owns" the processors 120 assigned to partition 100₁ and workload 2 "owns" the processors assigned to partition 100₂. Should workload 1 require four processors, that need can be satisfied by "borrowing" one of the processors 120 from the partition 100₂, should any of those processors 120 be "available." However, if none of the "owned" processors in the computer system 100 are available, and if the workload 1 is designated to use instant capacity processors 130, then the required processor capacity may be met by using one or more of the instant capacity processors 130.

To implement the enhanced capacity of the "large" computing system with its instant capacity processors 130, a TiCAP (temporary instant capacity) system 150 may be made available to the computer system user. Using the TiCAP system 150, the user acquires rights to use the instant capacity processors 130 by, for example, paying in advance for a certain quantity of processing time. Thus, the TiCAP system 150 allows one or more unlicensed instant capacity processors 130 to be activated for a period of pre-paid processing minutes without requiring permanent usage rights. When the instant capacity processor 130 is activated, the computer system user, under TiCAP, obtains temporary usage rights. Note that the instant capacity processors 130 also may be placed into operation under regimes other than TiCAP. For example, an instant capacity processor 130 may be placed into operation to replace a failed processor 120, if the computer system user has implemented such a service plan.

Although the above description, and that which follows, refers to instant capacity processors as TiCAP resources, the TiCAP system 150 may be applied to other shared computing system resources, including, for example, memory, network bandwidth, and storage facilities used by the computer system 100. Furthermore, the computer system may be configured exclusively with metered resources for which usage the computer system user pays an incremental cost; and may be configured with fully-licensed resources, exclusively. Whether configured with metered resources or fully-licensed resources, exclusively, or with a mix of the two, the computer system user may pay an incremental cost when additional resources are being consumed. For example, in a computer system with fully-licensed and metered resources, when more fully-licensed resources are being consumed, the computer system user will at least experience an incremental cost in terms of increased power consumption and consequent increased cooling demand. When more metered resources are being consumed, the computer system user experiences the increased costs of power consumption and cooling, but also may have an increased cost directly tied to using the metered resources (i.e., a pay-per-use cost). The computer system user, naturally, would like some means for monitoring and controlling these incremental costs. One such means includes a visual display that indicates when incremental costs are occurring. Note also, that although costs can increment up, due to added resource consumption, costs also can increment down due to reduced resource consumption. The visual display can provide an indication of current consumption and future, or predicted, consumption, so that the computer system user can anticipate these chances in cost, and can take actions as needed and as allowable, to change or control the cost of operating the computer system.

As an example of a TiCAP implementation, the computer system user may purchase 30 days of prepaid temporary activation for instant capacity processors 130. This allows the temporary processors 130 installed in the computer system 100 to be turned on and off, typically for short periods, to provide added capacity. A temporary instant capacity processor day is 24 hours, or 1,440 minutes of activation for one of the temporary processor cores 130. A TiCAP day may be used by one instant capacity processor 130 operating for 24 hours, or by four instant capacity processors 130 operating for six hours each. If and when the instant capacity processors 130 are placed into operation may be determined by one or more policies implemented by the computer system user. For example, the computer system user could specify that an instant capacity processor 130 be activated whenever the capacity of the corresponding processors 120 exceeds 90 percent, and that the instant capacity processor remain in operation until processor demand is reduced to 75 percent of the processors 120. Many other policies are possible to control activation of the instant capacity processors 130.

In an embodiment, the TiCAP system 150 resides as software on the user's computer system 100, and operates in a standalone manner (i.e., no connection to the TiCAP provider). As instant capacity processors 130 are activated, the user's prepaid account, as implemented and monitored by the TiCAP system 150, is debited. The TiCAP system 150 may predict, at the current rate of instant capacity processor usage, when the user's prepaid account will be depleted, and may send a message to the user with that information. Once the user's prepaid account balance reaches zero, the TiCAP system 150 will deactivate any operating instant capacity processors 130.

Computer system users may benefit from having a system more robust than just the TiCAP system 150 for managing workload on the computer system 100. Such a system would provide the computer system users with information needed to monitor the consumption of computing resources in a fashion that allows the users to understand the amount and source of that consumption and to make, if needed and/or desired, changes to policies that implement that consumption. Included in this more robust system is a provision to provide the computer system user with real time or near real time information relating expenditures (costs) for computing system resources based on the reallocation of those resources among workloads. For example, when instant capacity or TiCAP processors are accessed, the computer system user's expenditures for computing resources likely will increase. The computer system user would like to know why those costs increased, and to know specifically what workload demands led to the increases. In an embodiment, this information is provided to the computer system user by way of a visual or graphical interface. The interface may include varying iconic symbols and values to convey the resource expenditure information (see FIG. 3).

Figure 2:
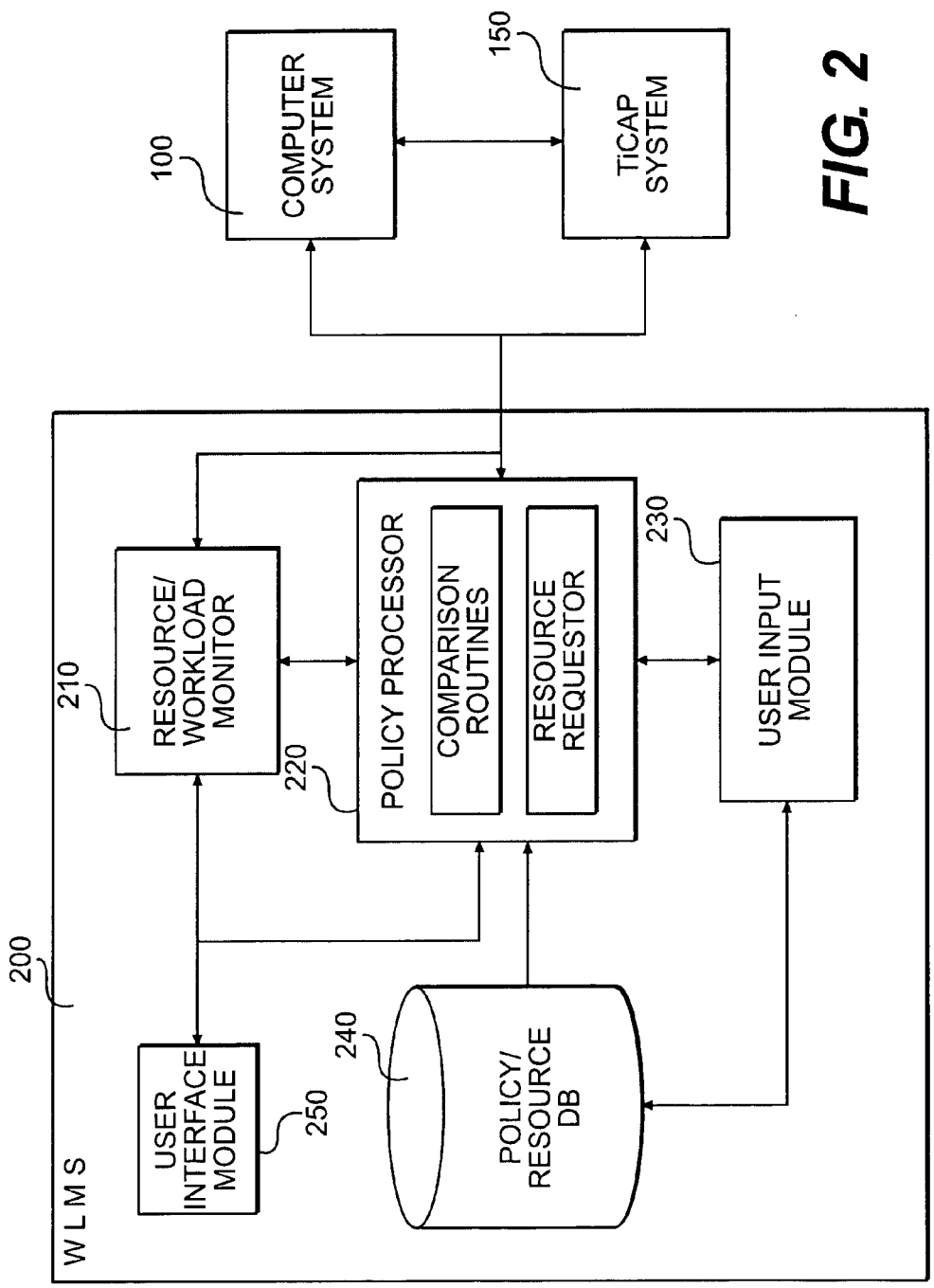
FIG. 2 is a block diagram of an exemplary workload management system.

FIG. 2 is a block diagram of an exemplary workload management system (WLMS) 200 that can be used to control resource utilization in the computer system 100 of FIG. 1, and which includes provision for visual display of information to the computer system user.

The WLMS 200 is an automated system that allows users to more precisely manage consumption of computing resources by workloads. A workload is a series of functions executed by an instance of an operating system, or by a subset of the operating system. Policy controls define if, and under what conditions, specific workloads may automatically consume TiCAP resources. Not all workloads are allowed access to TiCAP resources. Furthermore, each workload may be assigned a specific quantity of computing system resources that it "owns." For example, a workload may normally use one processor 120, but own two processors 120. In addition, the workload may be allowed, by a policy established by the computer system user, to "borrow" up to two additional processors. Should a workload require resources in excess of what the workload owns, the workload borrows up to the maximum allowable (for a total of four processors in the given example). When TiCAP resources are being consumed by the workloads, those workloads which are allowed to use TiCAP resources, and which are borrowing resources, are consuming TiCAP resources.

Shared resource domains are comprised of workloads, each of which is assigned a policy, and each of which is associated with a resource compartment. A resource compartment may be an operating system instance or a subdivision of an operating system instance.

In managing the computer system 100, the user identifies configurations of shared resource domains that the user wants to control. As noted above, the user also defines the policies to be implemented in controlling the shared resource domains. Such policies allow for automatic implementation of the TiCAP system 150, and automatic assignment of instant capacity processors 130, by specifying parameters under which the TiCAP resources may be activated. Thus, each shared resource domain includes workloads, each of which is assigned one or more policies and each of which is associated with a resource compartment.

In FIG. 2, WLMS 200 is coupled to the computer system 100 and TiCAP system 150. The WLMS 200 includes a resource monitor 210 that tracks which workloads are using which resources, and receives requests from the workloads to add additional resources. Coupled to the resource monitor 210 is policy processor 220, which applies policies set by the user with user input device 230 and stored in database 240, to determine if and when to apply additional resources to a requesting workload. Finally, user interface module 250 produces the user interfaces that the computer system user requires in order to efficiently manage the consumption of computer system resources.

The policies may be simple policies (allocate additional processing resources when percent utilization exceeds 75 percent) or complex (different rules for different times of the day, for example). More specifically, a conditional policy (rule set) may employ conditional statements based on the occurrence of specific event. For example, a complex (conditional) rule set may specify one rule for the hours 6 am to 6 pm (condition: the workload is important during daytime and is allowed to consume TiCAP resources), and a second rule for the hours 6 pm to 6 am (condition: the workload is not important during nighttime and is not allowed to consume TiCAP resources). Thus, a conditional policy is one way to create complex rule sets from simple policies.

An active policy is one that is currently applied to a workload based on which conditions are true for that workload. In the above example, if the time of day is noon, and a policy is being implemented, the true condition is daytime and the policy that will be applied is to assign additional TiCAP resources to the workload. If a condition associated with a workload is not true, the policy for the workload is not implemented.

With the workload policies established, the WLMS 200 can compare policy requirements to operating parameters for each active workload and each consumed or available resource to determine if resources assigned to the active workloads should be changed (increased or decreased). If a change is indicated, the WLMS 200 (the policy processor 220) will initiate a resource request. The resource request may then be sent to the TiCAP system 150. Consider, for example, processor utilization. The resource monitor 210 monitors two parameters: number of processors in use and processor utilization for each such processor, and processor demand from each workload. The resource monitor 210 then makes a prediction as to processor demand/utilization for the next operating interval of the computer system 100. For example, if two processors 120 are operating, each at 75 percent utilization, in order to support one workload, then 1.5 out of 2 processors are being used by the workload. The simplest prediction is that processor demand/utilization in the next interval will be the same as in the current interval of computer system operation. The computer system user will have specified that percentage of processor utilization at which the user believes the workload will be best operated (e.g., at 100 percent processor utilization, there is no margin for demand changes, and any further demand beyond 100 percent will impair workload operation). Thus if the resource monitor 210 "predicts" that the workloads will consume 1.5 processors, and the user wants processor utilization to be no more than 50 percent, then the user would prefer that an additional processor be placed in operation so that 1.5 out of 3 processors are operating, each at 50 percent utilization. To initiate a change in processors assigned to the workload, the WLMS 200 sends a resource request to the computer system 100, and that request may result in the assignment of one or more additional processors 120 to the workload. However, if the resource request cannot be met by assignment of processors 120 (e.g., none are available), the resource request may be passed to the TiCAP system 150, and one or more instant capacity processors 130 may be assigned to the workload. The distribution of processors to workload, including the assignment of instant capacity processors 130 may be shown on a visual display that is presented to the user in real time or near real time.

Figure 3:
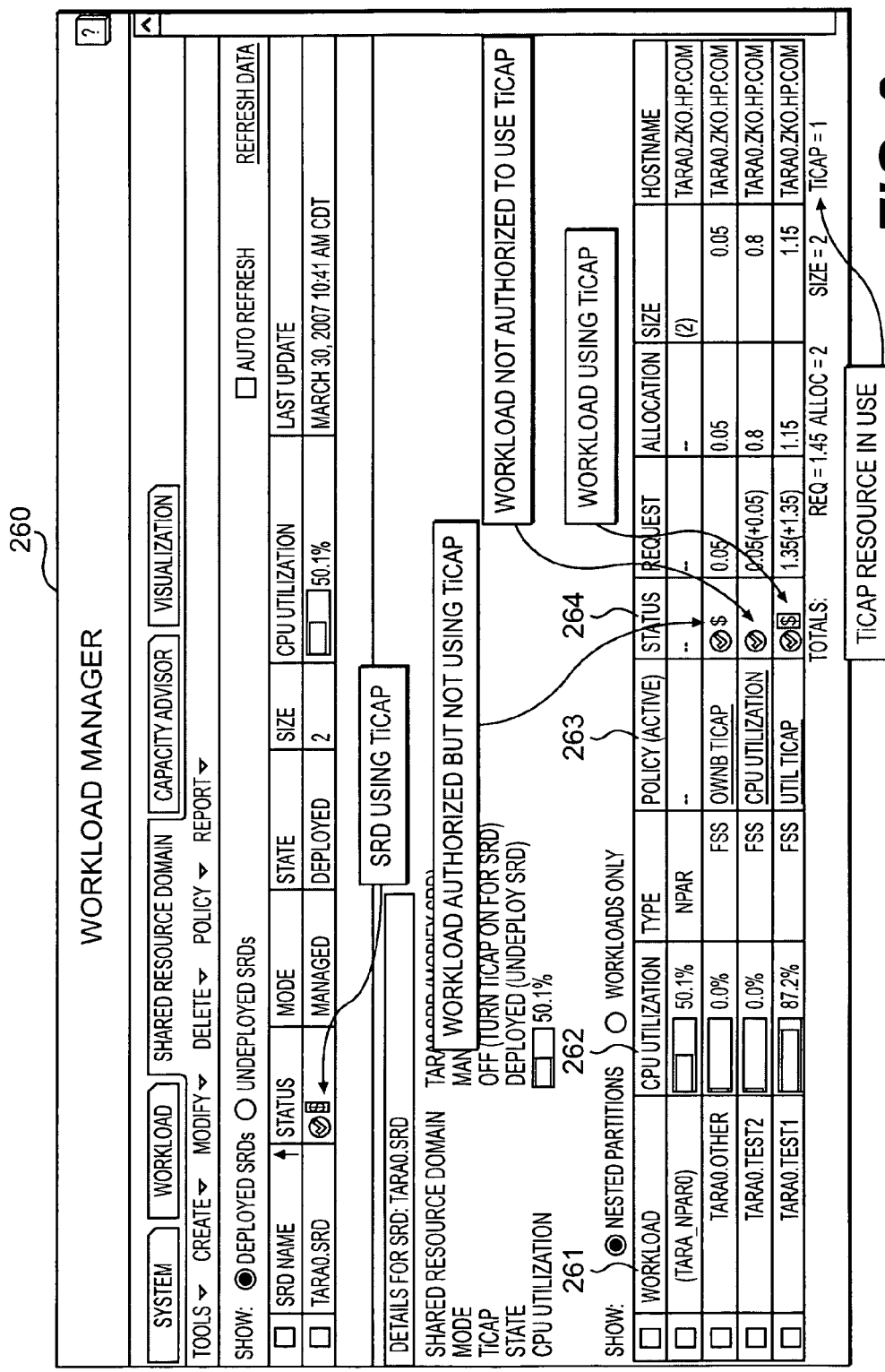
FIG. 3 illustrates an exemplary user interface for the system of FIG. 2.

FIG. 3 illustrates an exemplary user interface 260 for monitoring and controlling computing system resources of the computer system 100. The interface 260 includes identities 261 of workloads executing on the computer system 100, percent of processor utilization 262, active policies 263 for the workloads, and an indication 264 of whether TiCAP resources are authorized and being used by the workloads. The indication of TiCAP authorization and use may include display of various icons, as shown. The interface 260 includes other informational displays that allow the computer system user to monitor operations and to make decisions regarding control of the computing resources. For example, the interface 260 may use various icons to represent TiCAP authorization, TiCAP use, and the amount of TiCAP resources being consumed by a particular work load, a group of workload (arranged, for example, by partition) and the total TiCAP utilization. The icons may be caused to vary as to indicate changes in underlying data. For example, a workload may be authorized by policy to use TiCAP resources during weekdays but not weekends. Thus, a visual display generated for a weekend period would show that specific workload without a TiCAP authorization icon. Similarly, when a specific workload is actually using a TiCAP resource, the visual display would include an icon indicating TiCAP resources in use. Many other variations of the icons, and other data presented on the visual display, are possible. Upon viewing the status indications 264 and the active policies 263, the computer system user may decide to change the policies that pertain to a specific workload. Note that the user interface 260 may display conditions for a current computing interval or a future computing interval, or both. In addition, the computer system user may access similar displays for any prior computing interval.

Figure 4:
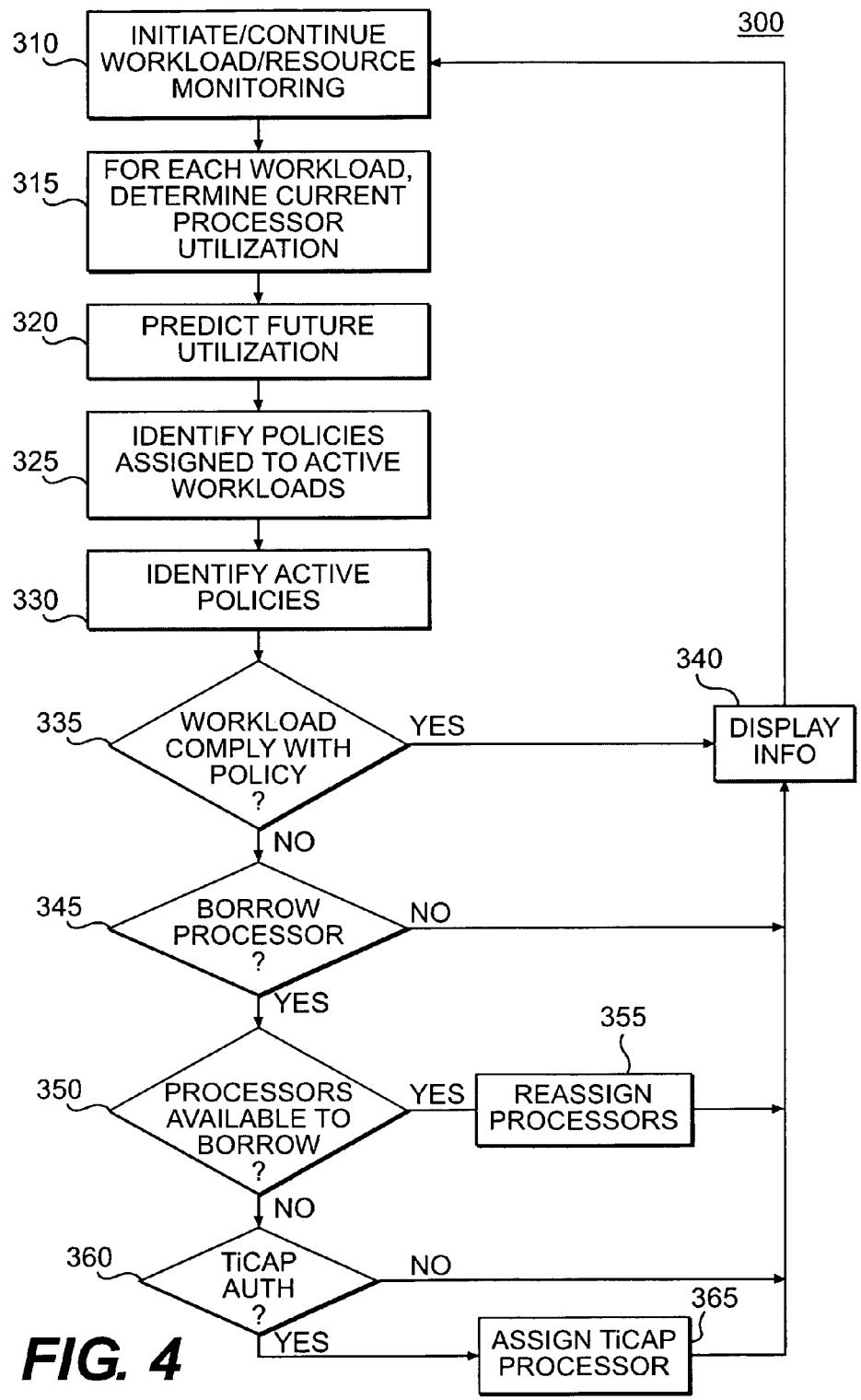
FIG. 4 is a flowchart illustrating an exemplary operation of the system of FIG. 2.

FIG. 4 is a flowchart illustrating an exemplary operation 300 executed by the WLMS 200 to allow monitoring and control of computing resources in the computer system 100. More particularly, the operation 300 is directed to controlling processor utilization within the computer system 100. The WLMS 200 may execute other operations for controlling processor resources or for controlling resources in the computer system 100 other than processors.

The operation 300 may execute on a continuous or periodic basis. As shown in block 310, the operation 300 begins a monitoring/control "cycle" by sampling information from each workload executing on the computer system 100 and each resource being consumed by the active workloads. Such sampling can use either a "push" or a "pull" methodology, whereby information periodically and automatically is sent from the workloads and the resources to the WLMS 200, or whereby information is sent to the WLMS 200 in response to a query or polling command initiated by the WLMS 200.

Once the requisite information is at the WLMS 200, for each workload, the WLMS 200 determines current processor utilization (block 315). In block 320, for each workload, the WLMS 200 predicts processor utilization for the next computer interval. In block 325, the WLMS 200 identifies assigned policies for each workload, and in block 330, determines from the identified and assigned policies, which policy (s) are active for each workload.

In block 335, the WLMS 200 determines for each workload if that workload's predicted processor utilization will meet the requirements of the workload's active policy(s). That is, a workload's predicted processor utilization could exceed that which can be supplied by the processors the workload currently is using, or the predicted workload could be sufficiently reduced such that one or more processors can be reassigned away from the workload. If the predicted processor utilization for all active workloads will conform to the active policies, the operation 300 moves to block 340.

In block 340, the WLMS 200 generates an update to the user interface 260 to provide the computer system used with a real time or near real time indication of the predicted requirements for resource allocation among the workloads. The visual display will also be updated to reflect iconic values to indicate which of the workloads is authorized to use TiCAP resources, for example, and an indication of current and future (predicted) TiCAP resource expenditures. Using the information provided with the visual display, the computer system user can: 1) obtain a dynamic record of computer system operations and expenditures, and 2) make policy adjustments to change the predicted resource allocations.

If the predicted processor utilization for one or more workloads will not conform to the workload's active policy(s), the operation 300 moves to block 345 and the WLMS 200 determines if the affected active workload can borrow processor resources from the non-instant capacity processors (i.e., the processors 120) that are not in use, or are not operating at their specified maximum capacity. The determination of borrowing is made, for example, on a specific policy that identifies a minimum, owned, and maximum processor assignment for the workload. In this example, if the workload owns two processors and has a maximum assignable number of four processors, then the workload may borrow up to two more processors to meet its predicted processor utilization requirements. If in block 345, the workload cannot borrow any additional processors, the operation 300 moves to block 340, and resource expenditure and workload operation is presented to the user in real time or near real time by way of the user interface 260, or a similar interface. However, if in block 345 the workload can borrow additional processors, the operation 300 moves to block 350.

In block 350, the WLMS 200 determines if there are any processors available to the workload to borrow to meet its predicted processor utilization requirements. If there are non-instant capacity processors available, the operation 300 moves to block 355 and the non-utilized processors are assigned to the workload. The operation 300 then moves to block 340. If, however, there are no non-instant capacity processors available, the operation moves to block 360. In block 360, the WLMS 200 determines if the workload can be assigned an instant capacity processor, and if such an instant capacity processor is available for assignment. If the workload cannot be assigned an instant capacity processor, or if none are available, the operation 300 moves to block 340. If the workload can be assigned an instant capacity processor, and if one or more are available, the operation 300 moves to block 365 and the TiCAP system 150 assigns the instant capacity processor to the workload. The operation 300 then moves to block 340 and the WLMS 200 produces information for display to the computer system user by way of the user interface 260, or a similar interface.

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

We claim:

1. A method, implemented on a computing device, for controlling computing resource consumption in a computing system, the computing system including one or more resources, the computing system executing one or more workloads, each of the workloads assigned one or more of the resources, each of the workloads operating in accordance with one or more active policies, the method, comprising:
   monitoring execution of the workloads and consumption of the resources;
   displaying on a first visual display, for a current computing interval, a number of the resources currently consumed by each executing workload;
   predicting for a subsequent computing interval, numbers of resources that will be consumed for each executing workload;
   providing the results of the prediction on a second visual display, wherein the first and the second visual displays include:
   workload identity,
   resource utilization,
   the active policies, and
   resource requests; and
   assigning a metered resource to a workload in the event said policies and said prediction indicate the workload requires an additional resource and no fully-licensed resource is available to be borrowed by the workload;
   wherein "metered resource" denotes a resource for which a user pays only while the resource is in use, "fully-licensed resource" denotes a resource for which a user pays whether or not it is in use, and "borrowed" denotes use of a resource by one workload while the resource is owned by another workload.

2. The method of claim 1, further comprising:
   determining an incremental cost associated with each change in resource utilization; and
   providing a visual indication of the incremental cost.

3. The method of claim 2, wherein the resources include plural fully-licensed resources and plural metered resources.

4. The method of claim 3, wherein the fully-licensed resources are fully-licensed processors and the metered resources are instant capacity processors, the method further comprising:
   identifying the active policies for each executing workload, the active policies specifying requirements for assignment of the fully-licensed processors to the workloads; and
   determining if the predicted number of fully-licensed processors complies with the identified active policies,
   wherein if the predicted number is more than the policy requirement, determining if the affected workload can borrow one or more fully-licensed processors and if the predicted number is less than the policy requirement, de-assigning one or more fully-licensed processors from the affected workload, and
   wherein, if the affected workload cannot borrow fully-licensed processors, determining if the affected workload can be assigned one or more instant capacity processors.

5. The method of claim 4 further comprising, if the affected workload can borrow one or more fully-licensed processors, assigning the one or more fully-licensed processors to the affected workload.

6. The method of claim 4 further comprising, if the affected workload can be assigned one or more instant capacity processors, assigning the one or more instant capacity processors to the affected workload.

7. The method of claim 1, further comprising:
   dividing the computer system into one or more partitions; and
   allowing borrowing of resources within a partition only and not across partition boundaries.

8. The method of claim 1, further comprising:
   dividing the computer system into one or more partitions; and
   allowing borrowing of resources across partition boundaries.

9. The method of claim 1, wherein the first and the second visual displays provide icons to indicate allowable assignment of resources to workloads.

10. The method of claim 9, further comprising modifying the icons to indicate a change in the amount of resources being consumed by each of the workloads.

11. The method of claim 1, wherein the resource utilization is provided in an aggregate amount, the aggregate amount indicated by an aggregate amount icon.

12. The method of claim 11, wherein the computer system is divided into partitions and wherein the aggregate amount is provided on a per partition basis.

13. The method of claim 1, wherein the resources are temporary instant capacity processors.

14. The method of claim 1, further comprising:
   receiving a modification to one or more policies; and
   determining compliance with the modified policies.

15. The method of claim 1, wherein the active policies vary with time of day.

16. A method; implemented as programming on a computer system, for controlling resource consumption in the computer system, the method comprising:
   monitoring current consumption of resources by workloads executing on the computer system;
   predicting future consumption of the resources by the workloads;
   adjusting assignment of resources to workloads based on the predicted future consumption, the adjusting including,
   determining consumption policies for each workload,
   comparing the policies to the predicted future consumption, and
   increasing or decreasing resources for each workload based on the comparison, said increasing including assigning a metered resource to a workload in the event said policies and said prediction indicate the workload requires an additional resource and no fully-licensed resource is available to be borrowed by the workload; and
   providing a visual display of resource consumption and workload execution information, the visual display including iconic values indicating predicted consumption of instant capacity resources and authorization to consume instant capacity resources;
   wherein "metered resource" denotes a resource for which a user pays only while the resource is in use, "fully-licensed resource" denotes a resource for which a user pays whether or not it is in use, and "borrowed" denotes use of a resource by one workload while the resource is owned by another workload.

17. The method of claim 16, wherein the resources are processors, and wherein the processors include plural fully-licensed processors and plural temporary instant capacity processors.

18. The method of claim 17, wherein the plural fully-licensed processors are owned by respective workloads and step of increasing resources first attempts to borrow one or more of the fully-licensed processors.

19. The method of claim 18, wherein if no fully-licensed processors are available to borrow, and the step of increasing resources includes activating one or more of the temporary instant capacity processors.

20. A system comprising non-transitory computer-readable storage media encoded with code that, when executed using a processor, defines functionality for:
a monitoring module that monitors current consumption of resources by workloads executing on the computer system;
a policy processing module that predicts future consumption of the resources by the workloads and provides a resource request to adjust assignment of resources to workloads based on the predicted future consumption, wherein the policy processing module determines consumption policies for each workload, and compares the policies to the predicted future consumption, and wherein resource requests call for increasing or decreasing resources for each workload based on the comparison;
a user interface module that generates a visual display of resource consumption and workload execution; and
a metered-resource system that assigns metered resources to a workload provided that equivalent fully-licensed resources are not available for the workload to borrow;
wherein "metered resource" denotes a resource for which a user pays only while the resource is in use, "fully-licensed resource" denotes a resource for which a user pays whether or not it is in use, and "borrowed" denotes use of a resource by one workload while the resource is owned by another workload.

21. The system of claim 20, wherein the visual display comprises:
workload identity;
processor utilization;
the consumption policies;
resource requests; and
instant capacity processor utilization, wherein the visual display provides a first icon to indicate allowable assignment of instant capacity processors to workloads and a second icon to indicate an amount of instant capacity processors being consumed by each workload.

22. A method for allocating resources among workloads for successive allocation periods in a system including metered resources for which a user pays only while the metered resources are in use and fully-licensed resources for which a user pays whether or not the fully-licensed resources are in use, said method comprising:
in response to a request for more resources in a subsequent allocation period than a first workload of said workloads is allocated in a present allocation period, determining whether there are fully-licensed resources not currently assigned to said first workload but available to fulfill said request,
if sufficient fully-licensed resources not currently assigned to said first workload are available to partially or completely fulfill said request, allocating fully-licensed resources to said first workload for said subsequent allocation period, and
if sufficient fully-resources are not available to completely fulfill said request, assigning at least one metered resource to said workload.

23. Non-transitory media encoded with code configured to implement the method of claim 22.

24. A method as recited in claim 22 wherein:
each of said workloads is assigned, for said allocation periods collectively:
a minimum resource level that must be allocated to that workload each allocation period,
a maximum resource level that must not be exceeded even if a high amount of said resources is requested, and
an owned resource level up to which resources are preferentially allocated to that owned resource level but, if they are not requested by that workload, may be borrowed by another workload so that the amount for resources allocated to a workload for an allocation period exceeds its owned amount for that allocation period; and
said allocating sufficient fully-licensed resources to said first workload includes allocating resources to said first workload according to the following priority levels,
available fully-licensed resources up to the minimum resource level for said first workload,
available fully-licensed resources up to the respective minimum resource level up to the owned resource level for said first workload, and
available fully-licensed resources owned by other workloads and not causing an allocation to exceed the maximum resource level for said first workload;
said assigning at least one metered resource occurring only if there are insufficient fully-licensed resources owned by other workloads other than said first workload available to meet the lesser of the requested amount and the respective maximum amount.

25. Non-transitory media encoded with code configured to implement the method of claim 24.

* * * * *

UNITED STATES PATENT AND TRADEMARK OFFICE
CERTIFICATE OF CORRECTION

PATENT NO.            : 8,782,655 B2                                Page 1 of 1
APPLICATION NO.       : 12/216235
DATED                 : July 15, 2014
INVENTOR(S)           : William H. Blanding et al.

It is certified that error appears in the above-identified patent and that said Letters Patent is hereby corrected as shown below:

In the Claims

In column 10, line 39, in Claim 16, delete "method;" and insert -- method --, therefor.

Signed and Sealed this
Fourth Day of November, 2014

Michelle K. Lee
*Deputy Director of the United States Patent and Trademark Office*